(12) United States Patent
Gal

(10) Patent No.: US 7,253,969 B2
(45) Date of Patent: Aug. 7, 2007

(54) SPHERICAL AND NEARLY SPHERICAL VIEW IMAGING ASSEMBLY

(75) Inventor: Ehud Gal, Reut (IL)

(73) Assignee: O.D.F. Medical Ltd., Tel Aviv (IL)

( * ) Notice: Subject to any disclaimer, the term of this patent is extended or adjusted under 35 U.S.C. 154(b) by 156 days.

(21) Appl. No.: 10/513,481

(22) PCT Filed: May 12, 2003

(86) PCT No.: PCT/IL03/00382

§ 371 (c)(1),
(2), (4) Date: Apr. 22, 2005

(87) PCT Pub. No.: WO03/096078

PCT Pub. Date: Nov. 20, 2003

(65) Prior Publication Data

US 2007/0002464 A1   Jan. 4, 2007

Related U.S. Application Data

(60) Provisional application No. 60/379,768, filed on May 14, 2002.

(51) Int. Cl.
*G02B 13/06* (2006.01)
*G02B 27/10* (2006.01)

(52) U.S. Cl. .................. 359/725; 359/618; 348/38

(58) Field of Classification Search ............ 359/725, 359/726, 664, 618, 627, 648; 348/36, 38, 348/47
See application file for complete search history.

(56) References Cited

U.S. PATENT DOCUMENTS

| | | | |
|---|---|---|---|
| 4,899,277 A | 2/1990 | Iizuka et al. | |
| 5,282,016 A | 1/1994 | Shen et al. | |
| 5,774,569 A | 6/1998 | Waldenmaier | |
| 5,790,182 A | 8/1998 | St. Hilaire | |
| 5,854,713 A | 12/1998 | Kuroda et al. | |
| 6,028,719 A | 2/2000 | Beckstead et al. | |
| 6,157,018 A | 12/2000 | Ishiguro et al. | |
| 6,222,683 B1 | 4/2001 | Hoogland et al. | |
| 6,341,044 B1 | 1/2002 | Driscoll, Jr. et al. | |
| 6,388,820 B1 | 5/2002 | Wallerstein et al. | |
| 6,392,687 B1 * | 5/2002 | Driscoll et al. | 348/36 |
| 6,424,377 B1 | 7/2002 | Driscoll, Jr. et al. | |
| 6,426,774 B1 | 7/2002 | Driscoll, Jr. et al. | |
| 6,449,103 B1 | 9/2002 | Charles | |
| 6,597,520 B2 | 7/2003 | Wallerstein et al. | |
| 2001/0002140 A1 * | 5/2001 | Medan et al. | 348/38 |
| 2001/0010555 A1 | 8/2001 | Driscoll, Jr. | |

(Continued)

FOREIGN PATENT DOCUMENTS

WO    02/059676    8/2002

(Continued)

*Primary Examiner*—Alicia M Harrington
(74) *Attorney, Agent, or Firm*—Ladas and Parry LLP

(57) ABSTRACT

The present invention describes several embodiments of electro-optical assemblies, which are capable of capturing full or nearly full spherical field of view. The present invention presents improvements of the prior art methods by unifying several methods to achieve coverage of a large field of view. The present invention provides a method for utilizing the concept of reflective surfaces and combining two image capture devices to achieve an even larger field of view than those presented previously.

6 Claims, 3 Drawing Sheets

U.S. PATENT DOCUMENTS

| | | |
|---|---|---|
| 2002/0126395 A1 | 9/2002 | Gianchandani et al. |
| 2002/0154417 A1 | 10/2002 | Wallerstein et al. |
| 2002/0159166 A1 | 10/2002 | Herman et al. |
| 2003/0095338 A1 | 5/2003 | Singh et al. |
| 2005/0231590 A1* | 10/2005 | Iwasaki .................. 348/47 |

FOREIGN PATENT DOCUMENTS

| | | |
|---|---|---|
| WO | 03/026272 | 3/2003 |
| WO | 03/046632 | 6/2003 |

* cited by examiner

SPHERICAL AND NEARLY SPHERICAL VIEW IMAGING ASSEMBLY

This application claims the benefit of U.S. Provisional Application No: 60/379,768 filed 14 May 2002 and incorporates the same by reference.

FIELD OF THE INVENTION

The present invention relates to the field of wide angle imaging. More specifically, it relates to electro-optical structures that enable capture of a hemispherical, nearly spherical or spherical scene.

BACKGROUND OF THE INVENTION

Imaging of a large field of view at the same instant is required for a wide variety of applications. Security cameras, for instance, are usually very limited in their field of view; therefore rotation/pan-tilt mechanisms are often implemented to enable accumulative coverage of the desired wide field of view. Inner body imaging during medical endoscopy procedures also represents a need to view as large field of view as possible, in order to achieve proper orientation while maneuvering the medical endoscope inside the body. Additional applications exist, and they all suffer from the currently limited field of view, which is provided by the lenses that are implemented in the image capture device.

As a result of the specified problems, prior art has provided methods of enlarging the field of view which is covered by an image capture device, by utilizing axi-symmetric reflective surfaces, which reflect a cylindrical field of view towards the image capture device. An example for such a method is described in Publication No. US 2002/0126395.

A more complex method is described in Publication No. US2001/0010555 and includes a design of a mirror assembly, comprised of two reflective surfaces and provides coverage of a cylindrical field of view.

Additional methods were presented, in order to enlarge the field of view beyond cylindrical. U.S. Pat. No. 6,028,719 describes the use of an axi-symmetric reflective surface with a hole in its center to achieve coverage of two scenes—a cylindrical scene which is reflected from the surface, and an additional scene, which is above the cylindrical scene, which penetrates through the hole and captured simultaneously by the same image capture device, thus a hemispherical field of view may be captured.

An improved method for capturing a hemispherical field of view is described in publication no. WO 02/059676, which is incorporated herein by reference.

Furthermore, the art has presented a method for acquiring a cylindrical field of view, together with an optically zoomed sector simultaneously. The method described in Publication No. WO 03/026272, which is incorporated herein by reference, makes use of an axi-symmetric reflective surface that reflects a cylindrical field of view towards an image capture device and an additional reflective surface which reflects an optically zoomed sector towards the same image capture device simultaneously.

Additional methods which rely on the use of an axi-symmetric reflective surface were presented, all rely on the concept of reflecting a large field of view towards an image capture device, and some include performing image processing to convert the image to a shape suitable for a human viewer.

It is therefore an object of the present invention to provide significant improvement to wide-angle image capture devices, by enlarging the field of view which is covered simultaneously.

It is further an object of the present invention to provide electro-optical structures that provide hemispherical, nearly spherical or spherical field of view coverage.

It is yet another object of the present invention to provide a method for achieving optical zoom of a sector, while continuously imaging a nearly spherical field of view.

Other objects of the invention will become apparent as the description proceeds.

SUMMARY OF THE INVENTION

The present invention presents a nearly spherical imaging assembly. In its basic embodiment the spherical imaging assembly of the invention comprises:
  a. An axi-symmetric lens, which provides at least a reflection of a cylindrical field of view;
  b. A first image capture device, which is positioned coaxially with said axi-symmetric lens; and
  c. A second image capture device, which is set to capture an image that is at least partially different from the image captured by said first image capture device.

In this embodiment, light rays from a first, cylindrical, scene are reflected by the axi-symmetric lens and captured by the first image capture device and light rays from a second scene, at least partially different from the first scene are captured by the second image capture device.

The first image capture device is directed towards the axi-symmetric lens and is set to capture the image that is reflected by the axi-symmetric lens. The second image capture device is positioned either opposite to the first image capture device or opposite to the axi-symmetric lens. In either case, the light rays from the first cylindrical scene are reflected by the axi-symmetric lens towards the first image capture device. The second image capture device can be positioned coaxially with the first image capture device.

In another embodiment of the invention, the nearly spherical imaging assembly further comprises a reflective surface positioned coaxially with the axi-symmetric lens and directed towards the axi-symmetric lens. In this embodiment the axi-symmetric lens comprises a transparent area in its center and the first image capture device is directed towards the reflective surface and set to capture the image that is reflected by the reflective surface after penetrating the transparent area in the axi-symmetric lens. The second image capture device is positioned opposite to the reflective surface. In this case, light rays from a first, cylindrical, scene are reflected by the axi-symmetric lens towards the reflective surface, are then reflected from the reflective surface, and travel through the transparent area towards the first image capture device. The second image capture device can be positioned coaxially with the first image capture device.

In another embodiment the nearly spherical imaging assembly of the invention further comprises:
  a) a transparent area in the center of the first axi-symmetric lens;
  b) a reflective surface, comprising a transparent area in its center, positioned coaxially with the first axi-symmetric lens, directed towards the first axi-symmetric lens.
  c) A second axi-symmetric lens providing at least a reflection of a cylindrical field of view, positioned opposite to the first axi-symmetric lens.

In this embodiment the first image capture device is directed towards the reflective surface and set to capture the image that arrives from the direction of the reflective surface after penetrating the transparent area in the first axi-symmetric lens. The second image capture device is, positioned coaxially with the second axi-symmetric lens, directed towards the second axi-symmetric lens, and set to capture the image that is reflected by the second axi-symmetric lens. With this optical arrangement, light rays from a first, cylindrical, scene are reflected by the first axi-symmetric lens towards the reflective surface, reflected from the reflective surface towards the transparent area in the first axi-symmetric lens, towards the first image capture device, and are captured by the first image capture device. Light rays from a second scene penetrate the transparent area in the reflective surface, travel toward the transparent area in the first axi-symmetric lens, penetrate the transparent area, and are captured by the first image capture device. Additionally, light rays from a third scene, at least partially different from the first scene, are reflected by the second axi-symmetric lens towards the second image capture device and captured by the second image capture device. The second axi-symmetric lens is positioned coaxially with the first axi-symmetric lens.

A variation of the previous embodiment of the nearly spherical imaging assembly of the invention further comprises optical lenses located at the exterior of the reflective surface, coaxially with the transparent area in the reflective surface. These optical lenses are designed to control the aperture of the second scene that is captured by the first image capture device.

Another embodiment of the nearly spherical imaging assembly of the invention further comprises a reflective surface located around the central axi of symmetry of the axi-symmetrical lens. This arrangement provides an optically zoomed reflection of a limited sector towards the first image capture device. In this embodiment, the first image capture device is directed towards the axi-symmetric lens and set to capture the image that is reflected by the axi-symmetric lens. The second image capture device is positioned opposite to the axi-symmetric lens. With this optical arrangement, light rays from a third scene comprising a partial sector of the first scene are optically zoomed and reflected by the reflective surface towards the first image capture device and are captured by the first image capture device. The second image capture device can be positioned coaxially with the axi-symmetric lens.

Another embodiment of the spherical imaging assembly of the invention further comprises:
a) a transparent area in the center of the first axi symmetric lens;
b) a first reflective surface, comprising a transparent area in its center, located coaxially with the first axi symmetric lens and directed towards this lens;
c) a second axi symmetric lens, comprising a transparent area in its center, providing at least a reflection of a cylindrical field of view. This second axi symmetric lens is positioned opposite to and coaxially with the first axi symmetric lens;
d) A second reflective surface, comprising a transparent area in its center, located coaxially with said second axi symmetric lens and directed towards this lens.

In this embodiment the first image capture device is directed towards the first reflective surface and set to capture the image that arrives from the direction of the first reflective surface after penetrating the transparent area in the first axi-symmetric lens. The second image capture device is positioned coaxially with the second axi-symmetric lens, directed towards the second reflective surface, and set to capture the image that arrives from the direction of the second reflective surface after penetrating the transparent area in the second axi-symmetric lens. Thus, light rays from a first, cylindrical, scene are reflected by the first axi symmetric lens towards the first reflective surface, reflected towards the transparent area in the first axi-symmetric lens, penetrate the transparent area, and are captured by the first image capture device. Simultaneously, light rays from a second scene, which is at least partially different from the first scene, penetrate through the transparent area in the first reflective surface, travel towards the transparent area in the first axi-symmetric lens, and are captured by the first image capture device. Simultaneously light rays from a third, cylindrical, scene are reflected by the second axi symmetric lens towards the second reflective surface, then reflected towards the transparent area in the second axi-symmetric lens, penetrate the transparent area, and are captured by the second image capture device. Also, simultaneously, light rays from a fourth scene, which is at least partially different from the third scene, penetrate through the transparent area in the second surface, travel towards the transparent area in the second axi-symmetric reflective lens, and are captured by the second image capture device.

All the above and other characteristics and advantages of the invention will be further understood through the following illustrative and non-limitative description of preferred embodiments thereof, with reference to the appended drawings.

DETAILED DESCRIPTION OF THE INVENTION

The present invention describes several embodiments of electro-optical assemblies, which are capable of capturing full or nearly full spherical field of view.

It is stressed that the present invention presents improvements of the prior art methods by unifying several methods to achieve coverage of a large field of view. The present invention provides a method for utilizing the concept of reflective surfaces and combining two image capture devices to achieve an even larger field of view than those presented previously. Issues such as mechanisms for positioning and fixating the lenses in relation to the image capture device are not discussed, as those have been presented in prior art and are familiar to those skilled in the art.

Figure 1:
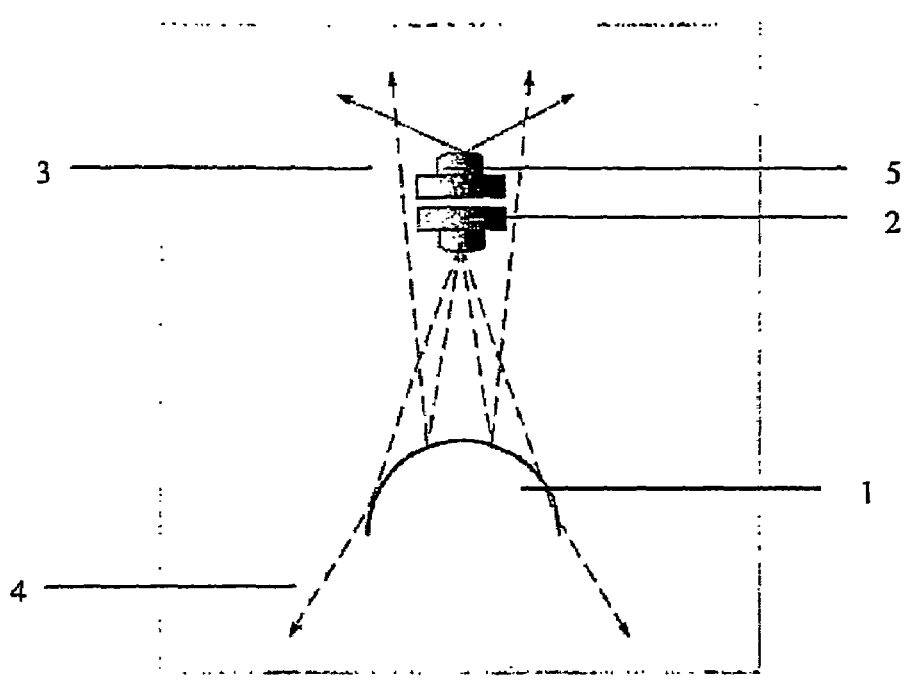
FIG. 1 schematically describes an imaging assembly that enables coverage of at least a hemispherical field of view.

FIG. 1 demonstrates a first embodiment of a nearly spherical field of view imaging assembly. According to this design, an axi-symmetric reflective lens (1) is positioned to reflect a first scene of a cylindrical field of view towards a first image capture device (2). The first image capture device (2) is positioned coaxially with the reflective lens (1), directed towards the reflective lens and set to capture the image reflected from the reflective lens (1). A schematic path (3) describes a light ray, which arrives from a direction close to the image capture device (2). The ray (3) hits the reflective lens (1) and is reflected towards the image capture device (2). A second schematic path (4) describes a light ray which represents the limit of the field of view which is covered by the lens (1). It is stressed that the first ray (3) and the second ray (4) are schematic, their path is schematic and they are dependant on the exact shape, structure and characteristics of the lens (1). It is further stressed that the rays described represents the limits of the field of view which is covered by the lens (1) therefore, every ray which originates between rays (3) and (4) will also be reflected by the lens (1) and captured by the first image capture device (2), therefore a cylindrical field of view is reflected by the lens (1) and captured by the first image capture device (2).

A second image capture device (5) is positioned coaxially with the first image capture device (2), opposite to it and preferably in conjunction with it, so it is directed to the opposite side, and set to capture a second scene. The second image capture device (5) may be equipped with a wide angle lens, such as a fish-eye lens, in order to enable coverage of a relatively large field of view.

The arrangement described in this figure provides a cylindrical field of view which is captured by the first image capture device (2) and an additional field of view which is captured by the second image capture device (5). The two fields of view together provide at least a hemispherical field of view.

Figure 2:
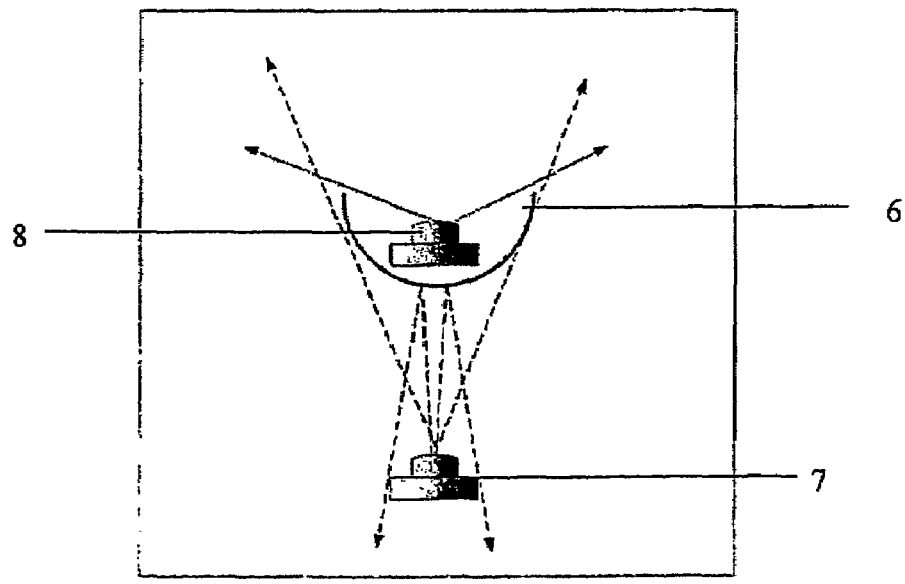
FIG. 2 schematically describes an imaging assembly that enables coverage of a nearly spherical field of view.

FIG. 2 demonstrates a second embodiment of an imaging assembly which enables coverage of a nearly spherical field of view. According to the present figure, an axi-symmetric reflective lens (6) is positioned to reflect a first scene of a cylindrical field of view towards a first image capture device (7). The first image capture device (7) is positioned coaxially with the reflective lens (6), directed towards the reflective lens (6) and set to capture the image reflected from the reflective lens (6). A second image capture device (8) is preferably positioned coaxially with the reflective lens (6), opposite to it, and preferably in conjunction with it, so that it is directed to the opposite side, and set to capture a second scene. The second image capture device (8) may be equipped with a wide angle lens, such as a fish-eye lens, in order to enable coverage of a large field of view.

The arrangement described in this figure provides a cylindrical field of view which is captured by the first image capture device (7) and an additional field of view which is captured by the second image capture device (8). The two fields of view together provide a nearly spherical field of view.

Figure 3:
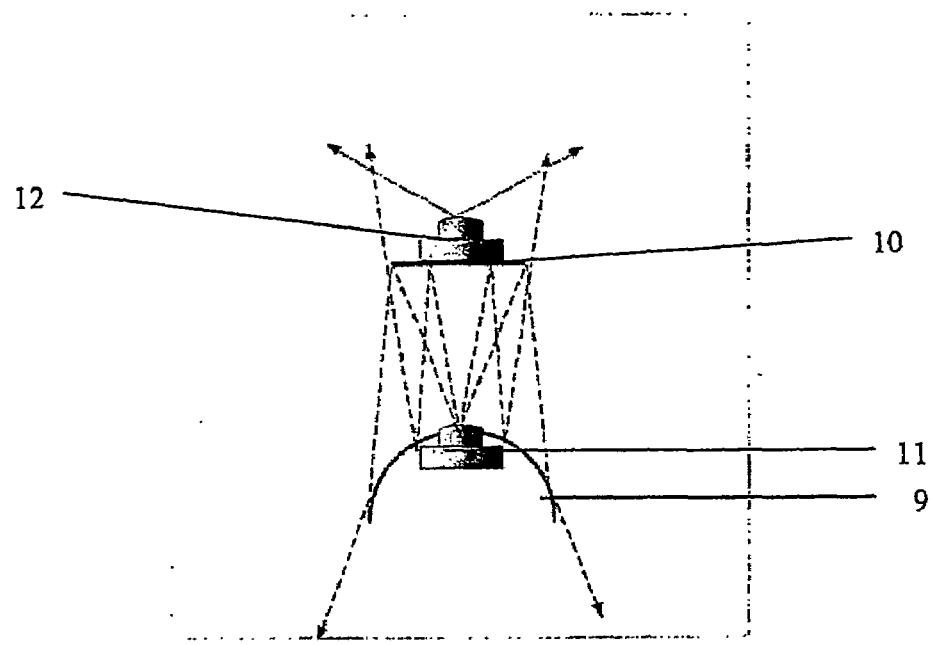
FIG. 3 schematically describes another imaging assembly that enables coverage of at least a hemispherical field of view.

FIG. 3 is a third embodiment of an imaging assembly, which enables coverage of a nearly spherical field of view. According to this figure, an axi-symmetric reflective lens (9) is positioned to reflect a first scene of a cylindrical field of view towards a reflective surface (10). A transparent area is formed in the center of the reflective lens (9). The reflective surface (10) is placed opposite to the reflective lens (9), and coaxially with it, so that the view that is reflected from the reflective lens (9) is reflected again from the reflective surface (10) towards the transparent area that exists in the center of the reflective lens (9). A first image capture device (11) is placed coaxially with the transparent area, so that it is set to capture the view that is doubly reflected from the reflective surface (10) and passes through the transparent area. A second image capture device (12) is positioned opposite to the reflective surface (10), preferably in conjunction with it, directed towards the opposite side and set to capture a second scene. The second image capture device (12) may be equipped with a wide angle lens, such as a fish-eye lens, in order to enable coverage of a large field of view.

The arrangement described in this figure provides a cylindrical field of view which is captured by the first image capture device (9) and an additional field of view which is captured by the second image capture device (12). The two fields of view together provide a nearly spherical field of view.

In the designs shown in FIGS. 1, 2, and 3, one of the image capture devices is used to capture a cylindrical field of view, which is reflected by one or more reflective surfaces and captured on the focal plane array of the image capture device as an image of a circular shape having certain aberrations. Those aberrations can be corrected by designated computer software that can also create an image of a shape suitable for viewing and understanding by the viewer. The other image capture device is used for direct capture of a second scene, which is preferably continuous or overlapping with the first scene. The output of the two image capture devices may be presented separately, or may be processed to form a single unified image of the entire field of view.

Figure 4:
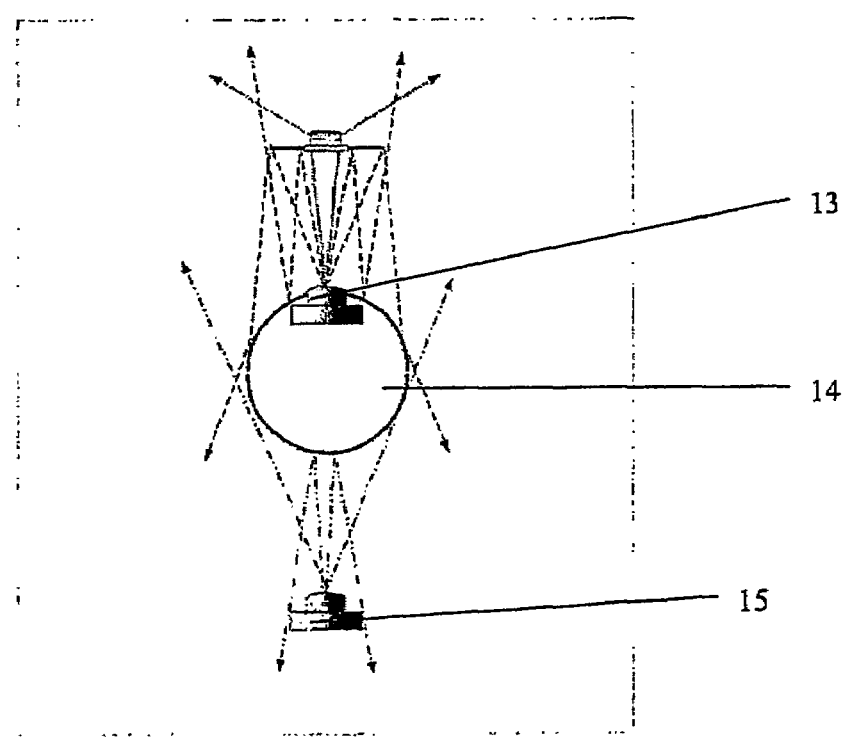
FIG. 4 schematically describes yet another possible design of an imaging assembly that enables coverage of a nearly spherical field of view.

FIG. 4 demonstrates a fourth possible design of an imaging assembly which enables coverage of an almost full spherical field of view imaging assembly. This design makes use of prior art design of a nearly spherical field of view imaging device, described in publication WO 02/059676. The present design utilizes the design described in the reference and incorporates additional electro-optical elements in order to enlarge the field of view that is covered. In the present design a first image capture device (13) is used to capture a first scene of a nearly spherical field of view. The first image capture device (13) is incorporated as part of a nearly spherical field of view imaging system described in the said references. Coaxially with the first image capture device (13) and opposite to it, an axi-symmetric reflective lens (14) is positioned. The said axi-symmetric reflective lens (14) is set to reflect a second scene of a cylindrical field of view towards a second image capture device (15), which is positioned coaxially with the reflective lens (14) and directed towards it. The second scene is preferably continuous or overlapping in part with the first scene covered by the first image capture device (13).

The arrangement described in this figure provides a nearly spherical field of view which is captured by the first image capture device (13) and an additional cylindrical field of view which is covered by the second image capture device (15). The two fields of view together provide a nearly spherical field of view.

According to another embodiment of the present invention, optical zoom within the nearly spherical field of view can be achieved. Optical zoom within a sector that is acquired directly by an image capture device, meaning—without use of reflective lenses, can be obtained by control of optical zoom capabilities of the image capture device itself. Optical zoom of a reflected sector is, however, more complex. Publication WO 03/026272 describes several designs which enable optical zoom when using reflective surfaces for coverage of a large field of view. An example of such a design is illustrated in FIG. 5.

Figure 5:
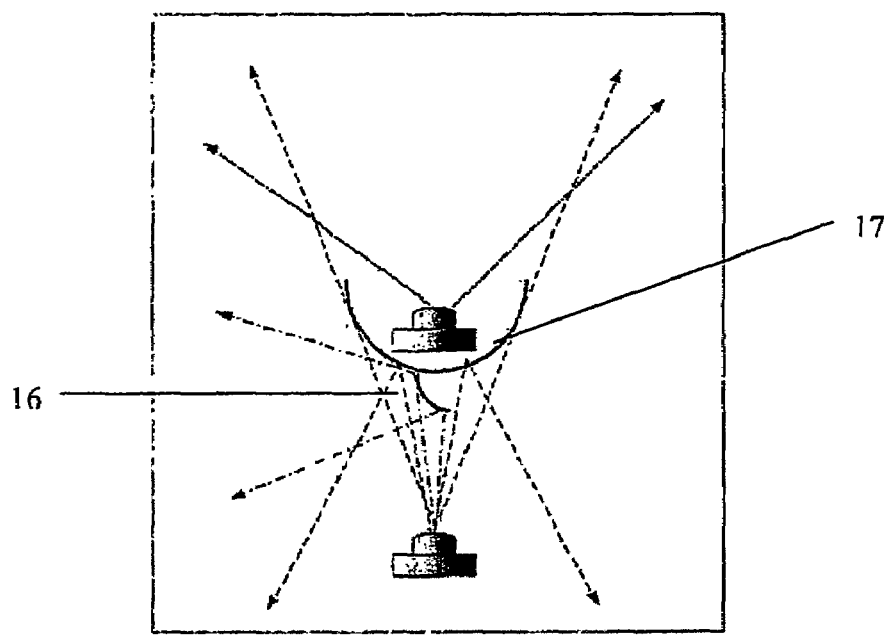
FIG. 5 schematically describes an imaging assembly that enables coverage of a nearly spherical field of view, together with an optically zoomed sector.
Figure 6:
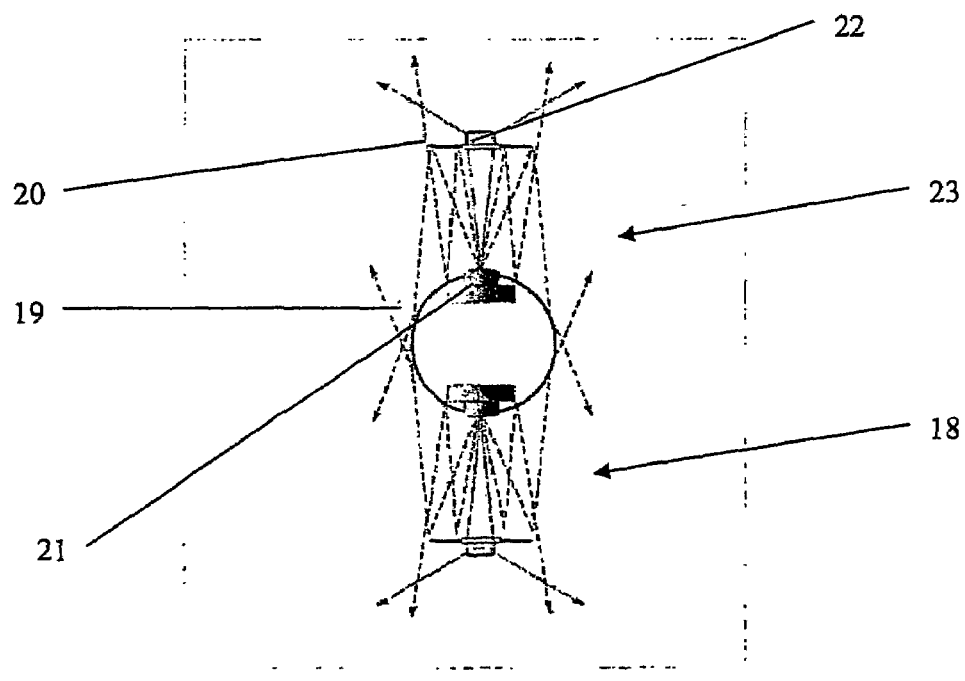
FIG. 6 schematically describes an imaging assembly that enables coverage of a full spherical field of view.

FIG. 5 demonstrates the imaging assembly that was shown in FIG. 2, with the addition of optical zoom capability within the cylindrical field of view. To achieve such capability, an additional reflective lens (16) is incorporated. The additional reflective lens (16) has different optical qualities than the axi-symmetric reflective lens (17) and is capable of reflecting a limited scene in different proportions than the axi-symmetric reflective lens (17). The reflective lens (16) is incorporated at the center of the axi-symmetric surface (17) and is set to reflect a zoomed sector towards an imaging assembly, located coaxially with the axi-symmetric lens (17).

According to yet another embodiment of the present invention there is provided an imaging assembly that enables coverage of a full spherical field of view. The said assembly is based on the use of two imaging systems, each provide a nearly spherical field of view. The imaging systems being used are extensively described in publication no. WO 02/059676. A first imaging assembly (23) is positioned to the back of an identical or similar imaging assembly (18). Each of the two imaging assemblies is directed towards the opposite direction, and set to capture a nearly spherical field of view. A preferable design is to position the two imaging systems in conjunction with each other, in order to ensure continuous cover of the entire spherical field of view, or with slight overlap in the fields of view that are covered. However, distance between the two imaging systems can be maintained, determined according to the desired application and field of view requirements.

Reference is now made, in detail, to the first imaging assembly (23). The imaging assembly (23) includes an axi-symmetric reflective lens (19) which reflects a cylindrical field of view towards a second reflective surface (20). At the center of the reflective lens (19) exists a hole, under which there is positioned an image capture device (21), set to capture the image that arrives through the said hole. Each light ray originating at a cylindrical field of view, which is covered by the reflective lens (19), will be reflected by the reflective lens (19) towards the second reflective surface (20). From there the ray will be reflected towards the hole that is locate at the center of the reflective lens (19) and will be captured by the image capture device (21). A hole also exists at the center of the second reflective surface (20), enabling an image of an additional scene to penetrate through the hole, travel directly towards the hole that is located at the center of the reflective lens (19) and be captured by the same image capture device (21) as the cylindrical scene. Overall, the image capture device (21) of the first imaging assembly (17) will capture two scenes simultaneously—a first, cylindrical, scene, and a second scene. The size of the second scene may be controlled by combination of additional optical lenses (22), thus by proper selection and placement of those optical lenses (22) above and/or around and/or below the hole of the second surface (20), it is possible to achieve a second scene which is continuous to the first, cylindrical scene.

The same components and process may be described in reference to the second imaging assembly (18).

Rotation of the entire imaging assembly is also possible for purposes of directing the image capture devices towards areas of interest, so that an area of interest will be included in the "second scene" of one of the imaging systems, meaning the area of interest will not be captured as the result of reflection, but as a result of direct capture by the image capture device.

Those skilled in the art will appreciate that although the figures describe schematic hemispherical reflective surfaces, many designs for those surfaces exist and the incorporation of a specific shape of those surfaces in the drawings should not limit the scope of the invention.

Although embodiments of the invention have been described by way of illustration, it will be understood that the invention may be carried out with many variations, modifications, and adaptations, without departing from its spirit or exceeding the scope of the claims.

The invention claimed is:

1. A nearly spherical imaging assembly comprising an axi-symmetric lens, providing at least a reflection of a cylindrical field of view; a first image capture device, positioned coaxially with said axi-symmetric lens; and a second image capture device, set to capture an image, at least partially different from the image captured by said first image capture device;

wherein, light rays from a first, cylindrical, scene are reflected by said axi-symmetric lens and captured by said first image capture device and light rays from a second scene, at least partially different from said first scene are captured by said second image capture device, said image assembly further comprising:

wherein,
a) the first image capture device is directed towards said reflective surface and set to capture the image that arrives from the direction of said reflective surface after penetrating said transparent area in said first axi-symmetric lens;
b) the second image capture device is positioned coaxially with said second axi-symmetric lens, directed towards said second axi-symmetric lens, and set to capture the image that is reflected by said second axi-symmetric lens;
c) light rays from a first, cylindrical, scene are reflected by said first axi-symmetric lens towards said reflective surface, reflected from said reflective surface towards said transparent area in the first axi-symmetric lens and towards said first image capture device, and are captured by said first image capture device;
d) light rays from a second scene penetrate said transparent area in said reflective surface, travel toward said transparent area in said first axi-symmetric lens, penetrate said transparent area, and are captured by said first image capture device; and
e) light rays from a third scene, at least partially different from said first scene are reflected by said second axi-symmetric lens towards said second image capture device and captured by said second image capture device.

2. A nearly spherical imaging assembly according to claim 1, further comprising optical lenses located at the exterior of the reflective surface, coaxially with the transparent area in the reflective surface; said optical lenses being designed to control the aperture of the second scene that is captured by the first image capture device.

3. A nearly spherical imaging assembly according to claim 1, wherein the second axi-symmetric lens is positioned coaxially with the first axi-symmetric lens.

4. A nearly spherical imaging assembly comprising an axi-symmetric lens, providing at least a reflection of a cylindrical field of view; a first image capture device, positioned coaxially with said axi-symmetric lens; and a second image capture device, set to capture an image, at least partially different from the image captured by said first image capture device; wherein, light rays from a first, cylindrical, scene are reflected by said axi-symmetric lens and captured by said first image capture device and light rays from a second scene, at least partially different from said first scene are captured by said second image capture device, said imaging assembly having optical zoom capability and further comprising a reflective surface located around the central axi of symmetry of the axi-symmetrical lens, providing an optically zoomed reflection of a limited sector towards the first image capture device;

wherein,
   a) the first image capture device is directed towards said axi-symmetric lens, set to capture the image that is reflected by said axi-symmetric lens;
   b) the second image capture device is positioned opposite to said axi-symmetric lens; and
   c) light rays from a third scene comprising a partial sector of the first scene are optically zoomed and reflected by said reflective surface towards said first image capture device and captured by said first image capture device.

5. A nearly spherical imaging assembly according to claim 4, wherein the second image capture device is positioned coaxially with the axi-symmetric lens.

6. A nearly spherical imaging assembly comprising an axi-symmetric lens, providing at least a reflection of a cylindrical field of view; a first image capture device, positioned coaxially with said axi-symmetric lens; and a second image capture device, set to capture an image, at least partially different from the image captured by said first image capture device; wherein, light rays from a first, cylindrical, scene are reflected by said axi-symmetric lens and captured by said first image capture device and light rays from a second scene, at least partially different from said first scene are captured by said second image capture device, said imaging device further comprising:

wherein,
   a) the first image capture device is directed towards said first reflective surface and set to capture the image that arrives from the direction of said first reflective surface after penetrating said transparent area in said first axi-symmetric lens;
   b) the second image capture device is positioned coaxially with said second axi-symmetric lens, directed towards said second reflective surface, and set to capture the image that arrives from the direction of said second reflective surface after penetrating said transparent area in said second axi-symmetric lens;
   c) light rays from a first, cylindrical, scene are reflected by said first axi symmetric lens towards said first reflective surface, then reflected towards said transparent area in said first axi-symmetric lens, penetrate said transparent area, and are captured by said first image capture device;
   d) simultaneously, light rays from a second scene, which is at least partially different from said first scene, penetrate through said transparent area in said first reflective surface, travel towards said transparent area in said first axi-symmetric lens, and are captured by said first image capture device;
   e) simultaneously light rays from a third, cylindrical, scene are reflected by said second axi symmetric lens towards said second reflective surface, then reflected towards said transparent area in said second axi-symmetric lens, penetrate said transparent area, and are captured by said second image capture device; and
   f) simultaneously, light rays from a fourth scene, which is at least partially different from said third scene, penetrate through said transparent area in said second surface, travel towards said transparent area in said second axi-symmetric reflective lens, and are captured by said second image capture device.

* * * * *